United States Patent
Ding et al.

(10) Patent No.: US 9,006,797 B2
(45) Date of Patent: Apr. 14, 2015

(54) MICRO-ELECTRO-MECHANICAL SYSTEM (MEMS) CAPACITIVE OHMIC SWITCH AND DESIGN STRUCTURES

(71) Applicant: International Business Machines Corporation, Armonk, NY (US)

(72) Inventors: Hanyi Ding, Colchester, VT (US); Qizhi Liu, Lexington, MA (US); Anthony K. Stamper, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/041,983

(22) Filed: Sep. 30, 2013

(65) Prior Publication Data

US 2014/0231236 A1     Aug. 21, 2014

Related U.S. Application Data

(62) Division of application No. 13/342,689, filed on Jan. 3, 2012, now Pat. No. 8,592,876.

(51) Int. Cl.
| | |
|---|---|
| *H01L 29/84* | (2006.01) |
| *H01H 1/00* | (2006.01) |
| *B81B 7/00* | (2006.01) |
| *G06F 17/50* | (2006.01) |
| *H01P 1/12* | (2006.01) |

(52) U.S. Cl.
CPC ............ *H01H 1/0036* (2013.01); *B81B 7/0006* (2013.01); *G06F 17/5063* (2013.01); *H01P 1/127* (2013.01); *G06F 17/5068* (2013.01); *B81B 2201/016* (2013.01)

(58) Field of Classification Search
CPC ................ H01L 2924/1461; H01L 2223/6627
USPC ........................... 257/254, 130, 444, E54.025
See application file for complete search history.

(56) References Cited

U.S. PATENT DOCUMENTS

| | | |
|---|---|---|
| 6,384,797 B1 | 5/2002 | Schaffner et al. |
| 6,639,488 B2 | 10/2003 | Deligianni et al. |
| 7,265,647 B2 | 9/2007 | Qian et al. |
| 7,541,898 B2 | 6/2009 | Qian et al. |
| 7,589,674 B2 | 9/2009 | Anagnostou et al. |
| 7,609,223 B2 | 10/2009 | Manasson et al. |
| 2010/0289717 A1 | 11/2010 | Arslan et al. |
| 2010/0314669 A1 | 12/2010 | Huang |

*Primary Examiner* — Elias M Ullah
(74) *Attorney, Agent, or Firm* — Anthony Canale; Roberts Mlotkowski Safran & Cole, P.C.

(57) ABSTRACT

A micro-electro-mechanical system (MEMS), methods of forming the MEMS and design structures are provided. The method includes forming a coplanar waveguide (CPW) comprising a signal electrode and a pair of electrodes on a substrate. The method includes forming a first sacrificial material over the CPW, and a wiring layer over the first sacrificial material and above the CPW. The method includes forming a second sacrificial material layer over the wiring layer, and forming insulator material about the first sacrificial material and the second sacrificial material. The method includes forming at least one vent hole in the insulator material to expose portions of the second sacrificial material, and removing the first and second sacrificial material through the vent hole to form a cavity structure about the wiring layer and which exposes the signal line and pair of electrodes below the wiring layer. The vent hole is sealed with sealing material.

12 Claims, 14 Drawing Sheets

Off State

On State

Insertion Loss < 0.35dB up to and beyond 100GHz
Return loss >20dB up to 100GHz

MICRO-ELECTRO-MECHANICAL SYSTEM (MEMS) CAPACITIVE OHMIC SWITCH AND DESIGN STRUCTURES

FIELD OF THE INVENTION

The invention relates to semiconductor structures and methods of manufacture and, more particularly, to Micro-Electro-Mechanical System (MEMS) capacitive ohmic switch structures, methods of manufacture, and design structures.

BACKGROUND

Integrated circuit switches used in integrated circuits can be formed from solid-state structures (e.g., transistors) or passive wires (MEMS). MEMS switches are typically employed because of their almost ideal isolation, which is a critical requirement for wireless radio applications where they are used for mode switching of power amplifiers (PAs) and their low insertion loss (i.e., resistance) at frequencies of around 1 GHz and higher. MEMS switches can be used in a variety of applications, primarily analog and mixed signal applications. One such example is cellular telephone chips containing a power amplifier (PA) and circuitry tuned for each broadcast mode. Integrated switches on the chip would connect the PA to the appropriate circuitry so that optimized performance for each mode can be obtained.

Depending on the particular application and engineering criteria, MEMS structures can come in many different forms. For example, MEMS can be realized in the form of a cantilever beam structure. In the cantilever structure, a cantilever arm (suspended electrode with one end fixed) is pulled toward a fixed electrode by application of an actuation voltage. The voltage required to pull the suspended electrode to the fixed electrode by electrostatic force is called pull-in voltage, which is dependent on several parameters including the length of the suspended electrode, spacing or gap between the suspended and fixed electrodes, and spring constant of the suspended electrode, which is a function of the materials and their thickness. Alternatively, the MEMS beam could be a bridge structure, where both ends are fixed.

MEMS can be manufactured in a number of ways using a number of different tools. In general, though, the methodologies and tools are used to form small structures with dimensions in the micrometer scale with switch dimensions of approximately 5 microns thick, 100 microns wide, and 200 microns long. In addition, many of the methodologies, i.e., technologies, employed to manufacture MEMS have been adopted from integrated circuit (IC) technology. For example, almost all MEMS are built on wafers and are realized in thin films of materials patterned by photolithographic processes on the top of the wafer. In particular, the fabrication of MEMS uses three basic building blocks: (i) deposition of thin films of material on a substrate, (ii) applying a patterned mask on top of the films by photolithographic imaging, and (iii) etching the films selectively to the mask.

However, the typical manufacture of MEMS also includes the transmission line and the MEMS switches being built separate, which can lead to decreased isolation and increased parasitic insertion loss. Although commonly used millimeter wave switches, such as switches comprised of SiGe HBT or GaAs pHEMT, have insertion loss typically of ~0.1 to 0.3 dB over 30-110 GHz and isolation typically of ~20-30 dB over 30-110 GHZ, the millimeter wave switches consume power for operation of the integrated circuit. The silicon on insulator (SOI) and complementary metal-oxide-semiconductor (CMOS) field-effect-transistors (FET) typically have high insertion loss and poor isolation at high frequencies. Moreover, metal ohmic contact MEMS switches are expensive and have not been produced on a large scale due to resistance degradation during cycling lifetime.

Accordingly, there exists a need in the art to overcome the deficiencies and limitations described hereinabove.

SUMMARY

In a first aspect of the invention, a method comprises forming a coplanar waveguide (CPW) comprising a signal electrode and a pair of electrodes on a substrate. The method further comprises forming a first sacrificial material over the CPW. The method further comprises forming a wiring layer over the first sacrificial material and above the CPW. The method further comprises forming a second sacrificial material layer over the wiring layer. The method further comprises forming insulator material about the first sacrificial material and the second sacrificial material. The method further comprises forming at least one vent hole in the insulator material to expose portions of the second sacrificial material. The method further comprises removing the first sacrificial material and the second sacrificial material through the vent hole to form a cavity structure about the wiring layer and which exposes the signal line and pair of electrodes below the wiring layer. The method further comprises sealing the at least one vent hole with sealing material.

In another aspect of the invention, a method comprises forming a coplanar waveguide on a first insulator layer, the coplanar waveguide comprising a signal line and ground lines. The method further comprises forming a fixed plate of a MEMS switch on a second insulator layer. The fixed plate is electrically connected with at least the signal line of the coplanar waveguide. The method further comprises forming a moveable plate of the MEMS switch over the fixed plate. At least a portion of the moveable plate is surrounded by a cavity structure formed by removal of a sacrificial material.

In yet another aspect of the invention, a structure comprises a coplanar waveguide (CPW) comprising a signal line and ground lines formed on a substrate. The structure further comprises a moveable plate provided over the CPW and facing the CPW. The moveable plate is structured to move towards the fixed plate in an "on" state and remain in an original position in an "off" state. In the "on" state an input signal on the signal line shorts to the ground lines. In the "off" state the input signal on the signal line passes though the moveable plate as an output signal.

In another aspect of the invention, a design structure tangibly embodied in a machine readable storage medium for designing, manufacturing, or testing an integrated circuit is provided. The design structure comprises the structures of the present invention. In further embodiments, a hardware description language (HDL) design structure encoded on a machine-readable data storage medium comprises elements that when processed in a computer-aided design system generates a machine-executable representation of the MEMS, which comprises the structures of the present invention. In still further embodiments, a method in a computer-aided design system is provided for generating a functional design model of the MEMS. The method comprises generating a functional representation of the structural elements of the MEMS.

More specifically, in aspects of the invention, a method is provided in a computer-aided design system for generating a functional design model of a MEMS structure. The method comprises: generating a functional representation of a coplanar waveguide (CPW) comprising a signal line and ground lines formed on a substrate; and generating a functional representation of a moveable plate provided over the CPW and facing the CPW, wherein the moveable plate is structured to move towards the fixed plate in an "on" state and remain in an original position in an "off" state. In the "on" state an input signal on the signal line shorts to the ground lines. In the "off" state the input signal on the signal line passes though the moveable plate as an output signal.

BRIEF DESCRIPTION OF THE SEVERAL VIEWS OF THE DRAWINGS

The present invention is described in the detailed description, which follows, in reference to the noted plurality of drawings by way of non-limiting examples of exemplary embodiments of the present invention. Those of skill in the art should recognize that the present figures are not drawn to scale, unless otherwise noted herein.

DETAILED DESCRIPTION

The invention relates to semiconductor structures and methods of manufacture and, more particularly, to Micro-Electro-Mechanical System (MEMS) capacitive ohmic switch structures, methods of manufacture, and design structures. More specifically, implementations of the invention provide a MEMS switch on a chip for millimeter wave applications and a method of manufacturing the MEMS switch on the chip such that there is less insertion loss and improved isolation at higher frequencies.

Advantageously, the MEMS switch and methods of manufacturing the MEMS switch eliminates increased resistance problems with MEMS ohmic switches or solid state switches during cycling. In embodiments, the configuration of the MEMS, which includes a plurality of electrode capacitive switches as ohmic switches at high frequency, can advantageously be implemented as standalone MEMS chips or integrated with a high voltage CMOS. In addition, advantageously, the MEMS switch and methods of manufacturing the MEMS switch are less expensive and insensitive to radio frequency biased induced dielectric charging of an actuator. This is due to the actuator and capacitor being decoupled by the electrode capacitive switch configuration. In addition, advantageously, the MEMS switch is insensitive to off capacitance since it is considered as part of a coplanar waveguide (CPW) line design and no longer a parasitic having a negative impact on signal integrity.

Figure 13:
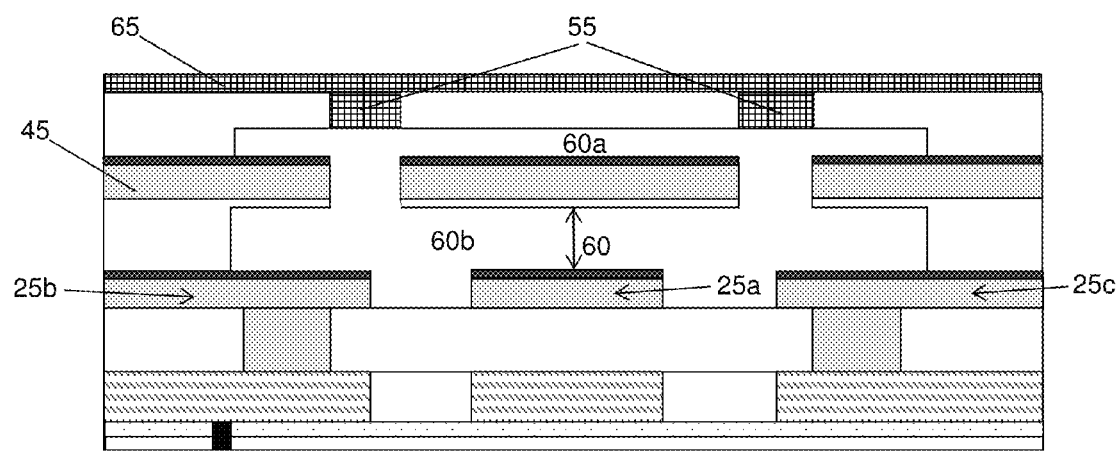
Figure 14:
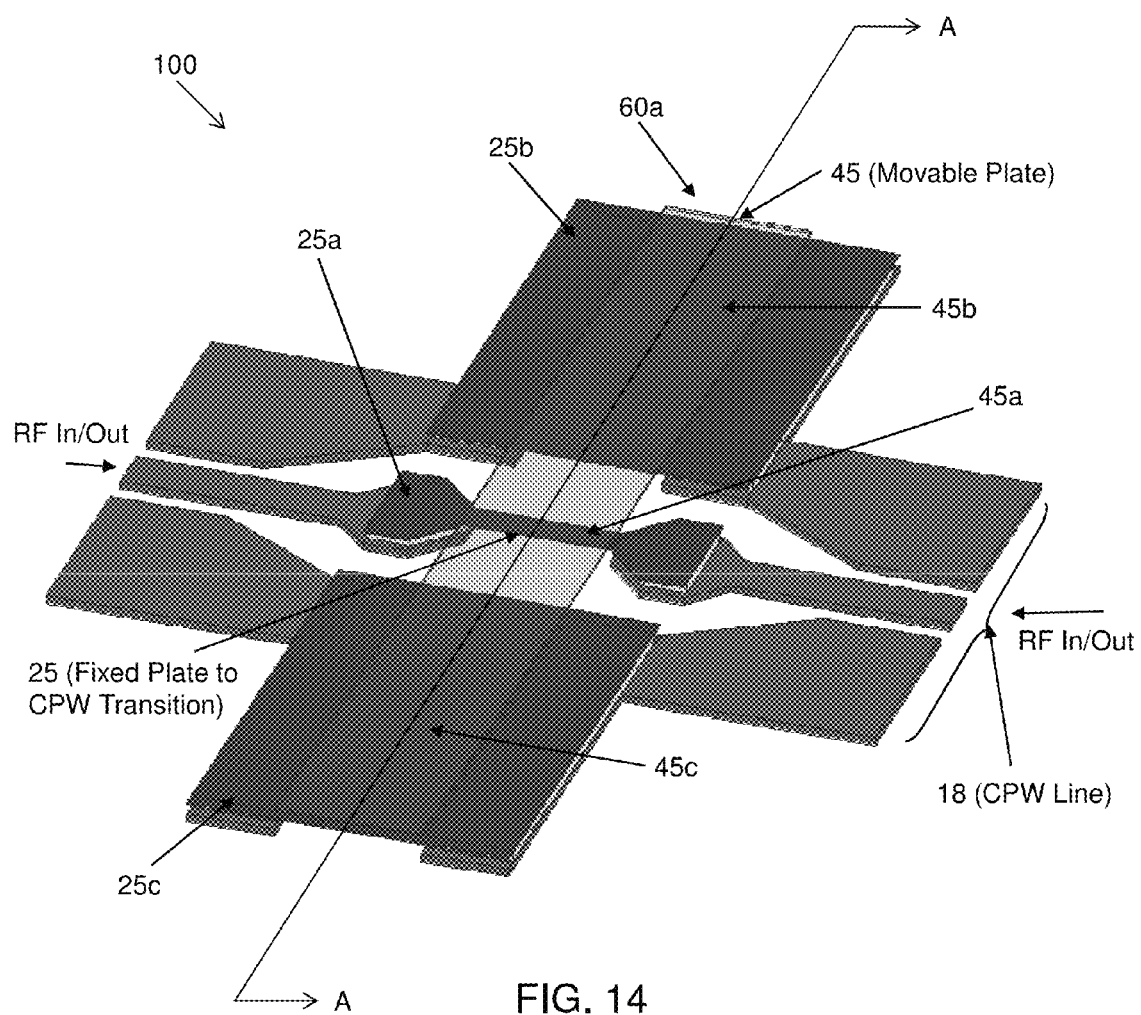
FIG. 14 shows a perspective view of an exemplary embodiment of a MEMS switch in accordance with aspects of the present invention.

FIGS. 1-13 show a fabrication process for building the structure of FIG. 14. More specifically, FIGS. 1-13 show a build process along cross section A-A of FIG. 14. In accordance with aspects of the invention, the structure of the MEMS switch of the below-described embodiments may be used in antennas for millimeter wave applications; however, the invention is not limited to this application and those of skill in the art will recognize that the invention can be practiced with many other applications.

Figure 1:
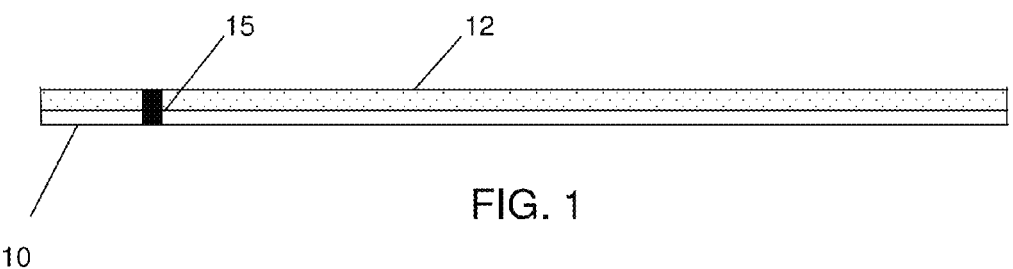
FIGS. 1-13 show various structures and related processing steps in accordance with aspects of the present invention.

FIG. 1 shows a structure and related processing steps in accordance with aspects of the invention. The structure includes, for example, a substrate 10. The substrate 10, in embodiments, can be any layer of a device. In embodiments, the substrate 10 is a silicon wafer coated with an insulator layer 12 e.g., silicon dioxide or other insulator material known to those of skill in the art. The insulator layer 12 may be formed on the substrate 10 such that it is a predetermined thickness, e.g., about 5 μm, using deposition processes known to those of skill in the art, e.g., chemical vapor deposition (CVD). An interconnect 15 is provided within the substrate 10 and the insulator layer 12. The interconnect 15 can be, for example, a tungsten or copper stud formed in a conventionally formed via. For example, the interconnect 15 can be formed using any conventional photolithographic, etching and deposition process, known to those of skill in the art for forming studs, such as a damascene process. The interconnect 15 could contact other wiring levels, CMOS transistors or other active devices, passive devices, etc. as known in the art. If the MEMS device is fabricated as an integrated passive device, with no CMOS or other active devices, interconnect 15 might not be needed because the MEMS device would be contacted from above using solder bumps, copper pillars, or the like.

Figure 2:
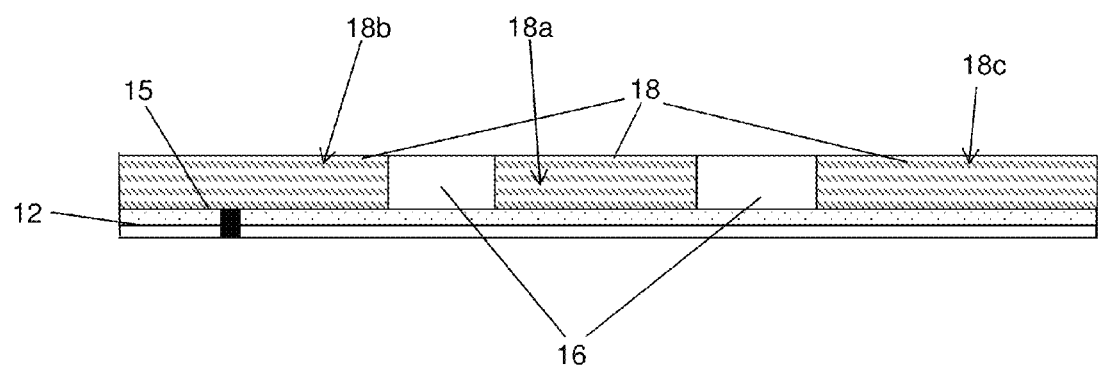

In FIG. 2, an insulator layer (dielectric layer) 16 is formed on the insulator layer 12 and exposed portions of the interconnect 15. In embodiments, the insulator layer 12 and insulator layer 16 may be formed in a same deposition process. The insulator layer 16 may comprise any suitable dielectric material, for example, $SiO_2$, TEOS, borophosphosilicate glass (BPSG), high density plasma (HDP) oxide, etc. In embodiments, the insulator layer 16 is an oxide deposited to about 3 μm; although other dimensions are also contemplated by the present invention. Deposition options for insulator layer 16 may include one or more of plasma-enhanced CVD (PECVD), sub-atmospheric CVD (SACVD), atmospheric pressure CVD (APCVD), high density plasma CVD (HDPCVD), physical vapor deposition (PVD), or atomic layer deposition (ALD).

As also shown in FIG. 2, the insulator layer 16 may be patterned using conventional photolithographic and etching processes. A metal can be deposited in openings of the insulator layer 16 to form multiple wires 18 (e.g., 18a, 18b, 18c, etc.) using conventional deposition processes. The insulator layer 16 and multiple wires 18 can then be planarized using chemical-mechanical planarization (CMP). In embodiments, the wires 18 have a thickness of about 3 μm and a sheet resistance of about 0.006 Ω/sq; although other dimensions are also contemplated by the present invention. Alternatively, wire layers 18 could be formed from other metals, such as Ti, Ta, TaN, and/or TiN cladded AlCu, using a subtractive etch process. In embodiments, wire layers 18 could be combined with wire layers 25 (FIG. 5) for simplification.

In alternative embodiments, the wiring layer can be deposited and patterned to form the wires (lower electrodes) 18, prior to the deposition of the insulator layer. In this embodiment, after the patterning process, the insulator layer 16 can be deposited. In embodiments, the wires 18 can be formed from copper; although other wiring materials are also contemplated by the present invention. In accordance with aspects of the invention, the wires 18 may be configured as a CPW line in which a first portion 18a is configured as a signal line and opposing portions 18b and 18c are configured as ground lines.

Figure 3:
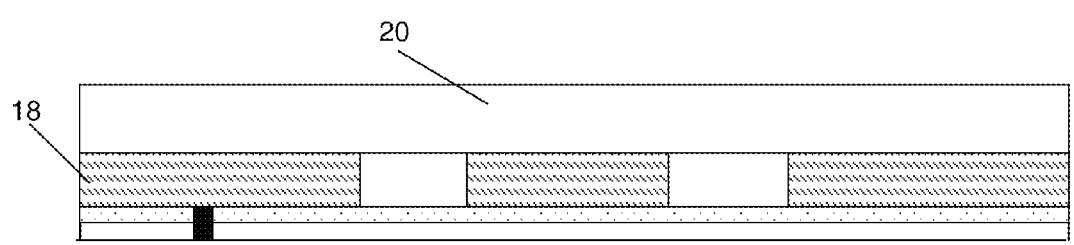

In FIG. 3, an insulator layer (dielectric layer) 20 is formed on the wires 18. In embodiments, the insulator layer 20 is a deposited oxide using any of the methods discussed above, and is formed to a thickness of about 0.5 to 4 μm; although other dimensions are also contemplated by the present invention. In the example of the wires 18 being first deposited and patterned, only a single insulator layer 20 is required.

Figure 4:
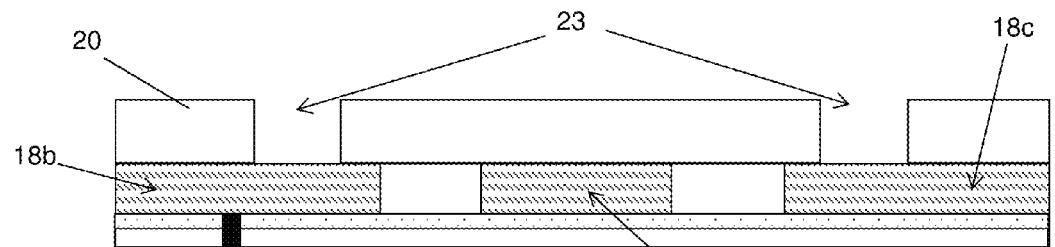

In FIG. 4, vias 23 may be formed in the insulator layer 20 to the underlying wires 18a, 18b, and 18c. The vias 23 may be formed using conventional photolithographic and etching processes, known to those of skill in the art. For example, etching the insulator layer 20 may be performed by applying a photoresist material on the insulator layer 20, and exposing and developing the photoresist material to form a pattern on the insulator layer 20. An etch process having a chemistry that selectively removes material of the insulator layer 20 may be performed to remove a portion of the insulator layer 20 that is not protected by the mask, to expose a surface of wires 18a, 18b, and 18c. (It should be understood by those of skill in the art that the cross sectional view of FIG. 4 does not show the opening to wire 18a; however such an opening may be available in another plane.) The etch process may comprise a reactive ion etch (RIE), for example.

Figure 5:
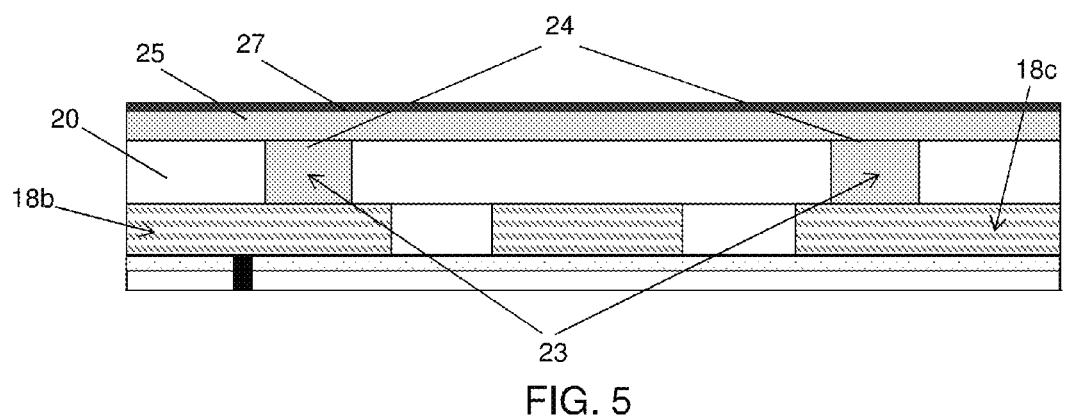

In FIG. 5, contacts 24 are deposited within the vias 23 to contact (electrically contact) the underlying wires 18b and 18c using conventional deposition processes. The contacts 24 can be, for example, a tungsten or copper stud formed in vias 23. For example, the contacts 24 can be formed using any conventional photolithographic, etching and deposition process, known to those of skill in the art for forming contacts, such as a damascene process.

FIG. 5 also shows an electrode formation process. Specifically, a wiring layer 25 (e.g., an electrode) is deposited over the insulator layer 20 and contacts 24. In embodiments, the wiring 25 can be, for example, Ti/AlCu/Ti/TiN with an anneal to convert the metal stack to $TiAl_3$/AlCu/$TiAl_3$/TiN; although other materials are also contemplated by the invention. The thicknesses of this and other electrodes and/or wires can vary depending on the specific design parameters. For example, a Ti/AlCu/Ti/TiN layer could be used to form the wiring 25 with a thickness of about a 0.5 μm and a sheet resistance of about 0.08 Ω/sq. An insulator layer 27 is formed on the wiring 25. For example, the wiring 25 may be coated with an insulator layer 27 of, for example, silicon dioxide, which provides a certain capacitance. In embodiments, the insulator layer 27 may be formed using any conventional deposition process known to those of skill in the art, as discussed herein. For example, the insulator layer 27 can be deposited on the wiring 25 to a thickness of about 0.1 μm; although other dimensions are also contemplated by the present invention.

Figure 6:
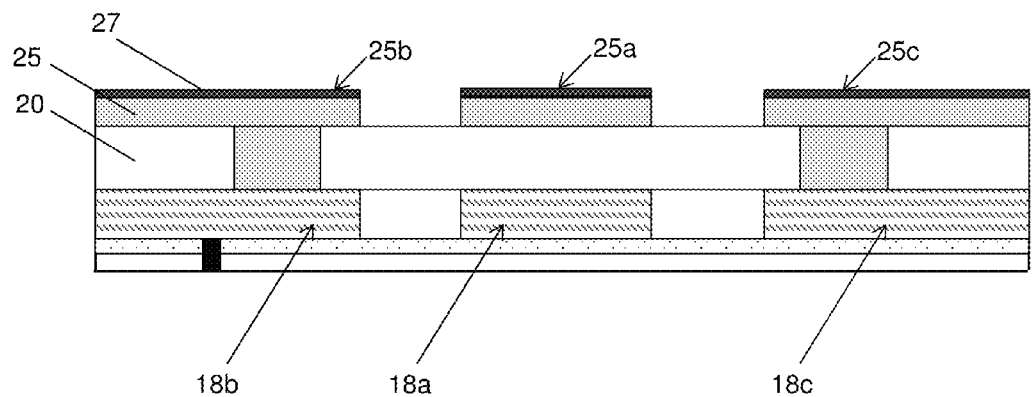

As shown in FIG. 6, the insulator layer 27 and the wiring 25 may then be patterned to form three separate electrode portions 25a, 25b, and 25c, using any conventional patterning and etching processes known to those of skill in the art. In accordance with aspects of the invention, the electrodes 25a, 25b, and 25c are operatively connected respectively to CPW line wires 18a, 18b, and 18c.

Figure 7:
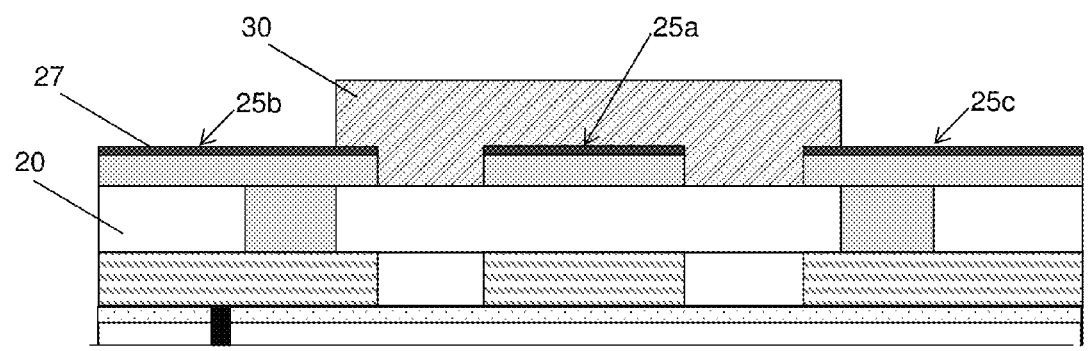

In FIG. 7, a sacrificial material 30 is conformally deposited over the insulator coated electrodes 25a, 25b, and 25c. In embodiments, the sacrificial material 30 may be formed using any conventional deposition process known to those of skill in the art, as discussed herein. The sacrificial layer 30 may comprise a material such as CVD or sputtered silicon and/or polydimethylglutarimide polymer (PMGI); although other materials are also contemplated by the invention. The sacrificial material 30 may be patterned using conventional photolithographic and etching processes. In this exemplary illustration, the sacrificial material 30 remains over the electrode (wire) 25a and the electrodes (wires) 25b and 25c. In embodiments, the sacrificial material 30 is formed over portions of the electrodes 25b and 25c or the entirety of the electrodes 25b and 25c. Preferably, the sacrificial material 30 is formed over the entirety of the electrodes 25b and 25c. In any event, as discussed in detail below, those of ordinary skill in the art would understand that the sacrificial material 30 should be formed over the electrodes 25b and 25c such that upon removal of the sacrificial material 30 and, hence the formation of a lower cavity, the electrodes 25b and 25c will provide a large enough area to provide a designed capacitance when the structure is in an on-state (with relationship to a moveable plate).

Figure 8:
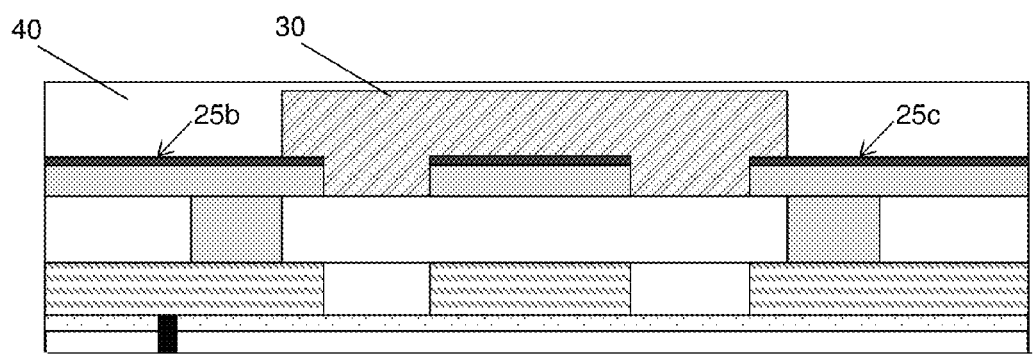

In FIG. 8, an insulator material 40 may be deposited over the sacrificial material 30 and exposed portions of the electrodes 25b and 25c. In embodiments, the insulator material 40 is a deposited oxide using any of the methods discussed above. For example, the sacrificial material 30 and remaining portions of the electrodes 25b and 25c may be coated with an oxide material 40.

Figure 9:
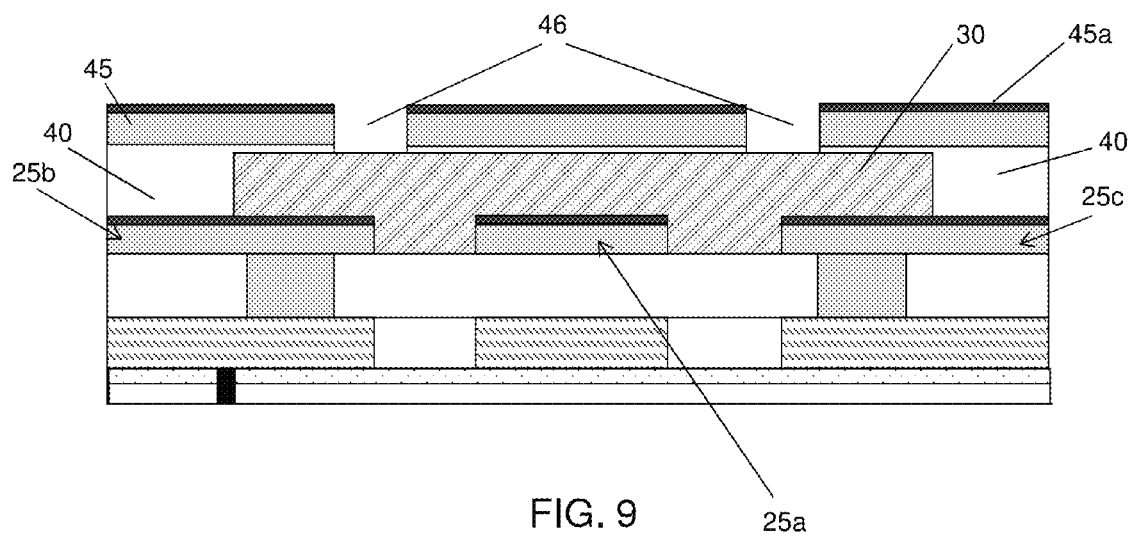

In FIG. 9, an electrode 45 is formed over insulator material 40. In embodiments, the electrode 45 can be formed from aluminum or an aluminum alloy such as AlCu, AlSi, or AlCuSi or copper; although other wiring materials are also contemplated by the present invention. For example, the electrode 45 can be a refractory metal such as Ti, TiN, TiN, Ta, TaN, and W, or AlCu, amongst other wiring materials. For example, the electrode 45 can be made from the same materials as the MEMS beam. In embodiments, a Al and/or Cu layer could be used to form the electrode 45 with a thickness of about 1.0 μm and a sheet resistance of about 0.04 Ω/sq. In accordance with aspects of the invention, the electrode 45 is formed and configured as a moveable plate (i.e., a beam) of the MEMS switch that can move towards the fixed electrode 25a.

Optionally, an insulator layer 45a may be formed on the electrode 45. For example, the electrode 45 may be coated with an insulator layer of silicon dioxide, so that the MEMS beam has symmetrical or nearly symmetrical silicon dioxide above and below the beam. In embodiments, the insulator layer 45a may be formed using any conventional deposition process known to those of skill in the art, as discussed herein. For example, the insulator layer 45a can be deposited on the electrode 45 to a thickness of about 0.1 μm; although other dimensions are also contemplated by the present invention. Still referring to FIG. 9, the metal layer 45, and optionally the insulator layer 45a, can be patterned to form the upper electrode, which will expose portions of the sacrificial layer 30.

It should be understood that the MEMS beam can be a metal-insulator-metal sandwich which is coated in thin silicon dioxide above and below. Alternatively, any MEMS beam structure could be used, e.g. a thick metal beam without the metal-oxide-metal sandwich, etc.

FIG. 9 also shows cavity vias 46 formed to the lower MEMS cavity which are formed in the structure in order to remove the sacrificial material 30 at a later step, as discussed below in detail. For example, in embodiments, the cavity vias 46 are formed in the electrode 45 and the insulator material 40 to expose the sacrificial material 30. The cavity vias 46 can be formed using conventional photolithographic and etching processes. In embodiments, the cavity vias 46 can be different shapes such as rectangular, circular or octagonal, and can be located at many different positions on the structure, e.g., in an array or isolated.

Figure 10:
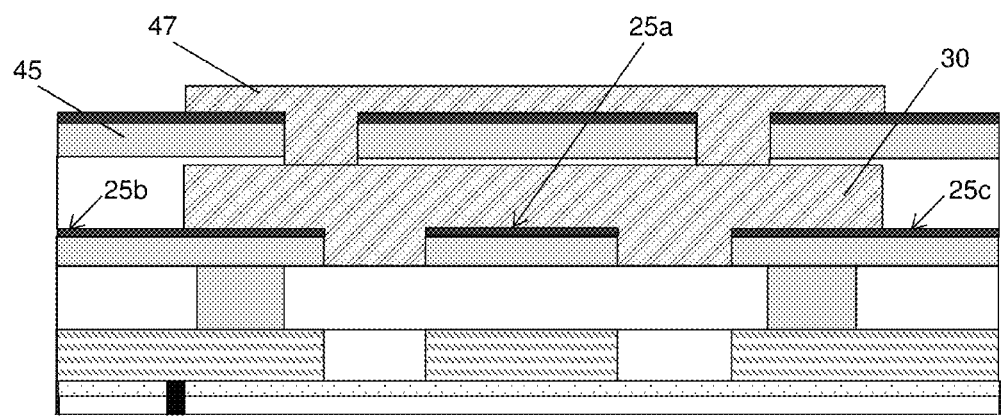

In FIG. 10, a sacrificial material 47 is deposited over the electrode 45 and in contact with the sacrificial material 30. In embodiments, the sacrificial material 47 may be formed using any conventional deposition and patterning processes known to those of skill in the art, as discussed herein. The sacrificial layer 47 may comprise a material similar or identical to the one used for the lower cavity 30, although other materials are also contemplated by the invention. Prior to the deposition of the sacrificial material 47, the lower sacrificial material can be cleaned to remove any residual oxide. As should be understood by those of skill in the art, the sacrificial material 30 and sacrificial material 47 will form a lower cavity and an upper cavity, respectively, of a MEMS beam.

Figure 11:
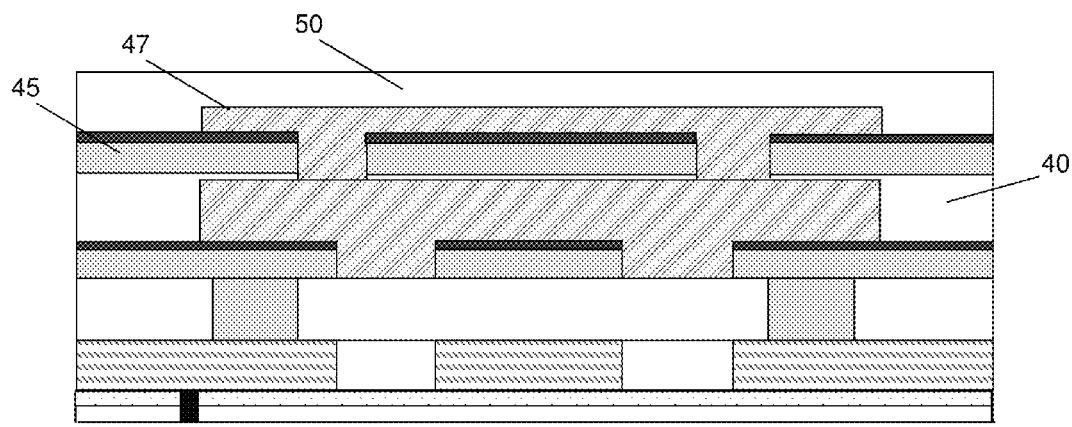

In FIG. 11, an insulator material 50 is conformally deposited over the electrode 45 and sacrificial material 47. In embodiments, the insulator material 50 is a deposited oxide using any of the deposition methods discussed above, and is deposited to a thickness of about 1-5 µm. The insulator material 50 should be thick enough to avoid cracking when the sacrificial material below the insulator material 50 is vented.

Figure 12:
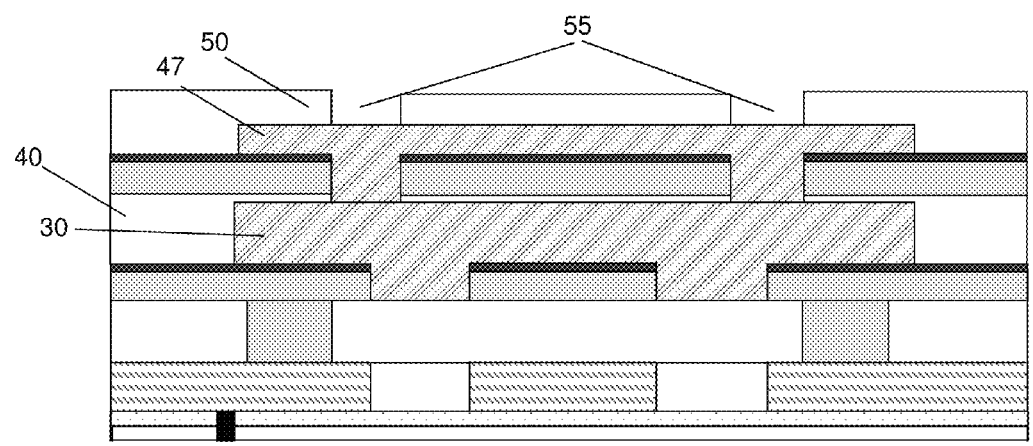

In FIG. 12, vent holes 55 may be formed in the structure in order to remove the sacrificial materials 30 and 47. For example, in embodiments, the vent holes 55 are formed in the insulator material 50 to expose the sacrificial material 47. The vent holes 55 can be formed using conventional photolithographic and etching processes. In embodiments, the vent holes 55 can be different shapes such as circular or octagonal, and can be located at many different positions on the structure. For example, the vent holes 55 can be located over the sacrificial material 47, over the sacrificial material 30, or both.

In FIG. 13, the sacrificial layers 30 and 47 may be removed through the vent holes 55 using conventional etching techniques. For example, the sacrificial layers 30 and 47 may be removed using a $XeF_2$ venting process as known in the art if silicon is used for the sacrificial material or a microwave downstream oxygen plasma of PMGI is used for the sacrificial material. In accordance with aspects of the invention, the removal of the sacrificial layers 30 and 47 will form an air gap or upper cavity 60a and lower cavity 60b. In embodiments, the lower cavity 60b is positioned between the lower fixed electrodes 25a, 25b, and 25c and the upper electrodes 45. The air gap 60 can be about 2 µm with a Coff of approximately 10-100 fF and a Con of approximately 1000 fF and 10,000 fF between the electrodes 45a and 25a, As also shown in FIG. 13, sealing layer 65 may be deposited in the vent holes 55 such that the upper cavity 60a and lower cavity 60b become vacuum-sealed or air tight. In embodiments, the sealing layer 65 may comprise any suitable non-conformal plugging material, for example PECVD silicon dioxide using silane as a silicon source and $N_2O$ as an oxidizer.

As shown in FIG. 14, a MEMS device 100 is provided comprising the fixed plate electrode 25, which forms a ground-signal-ground (GSG) CPW line that is designed into or as a portion of the transmission line or CPW line wire 18. A CPW line is a structure in which all of the conductors supporting wave propagation are located on a same plane, e.g., typically formed on a top of a dielectric substrate (e.g., insulator layer 20). The fixed plate electrode 25 or GSG CPW line is comprised of a median metallic strip (the electrode portion 25a) separated by two narrow slits from a ground plane (the electrode portions 25b and 25c). The moveable plate electrode 45 forms three capacitors to the fixed plate electrode 25 or GSG CPW line. Specifically, the electrode portion 45a forms a capacitor with the signal line (e.g., the electrode portion 25a) and two capacitors are formed between the electrode portions 45b and 45c and the side ground lines (e.g., the electrode portions 25b and 25c).

The moveable plate electrode 45 is configured to bend downward toward the fixed plate electrode 25 (25a, 25b, and 25c) or GSG CPW line in an "on" state. To actuate the MEMS device 100, a dc voltage may be applied between the conductor(s) in the moveable plate electrode 45 e.g., a MEMS beam, and the fixed conductor(s) in the fixed plate electrode 25 below the MEMS beam.

The MEMS device 100 as shown in FIG. 14 is a two terminal device with shared electrodes for actuation and signal. For example, with the MEMS beam in an up position, a dc voltage is not applied to the signal line 25a and the MEMS beam is grounded. To actuate the MEMS beam, which will shunt the signal on the signal line 25a to ground, a dc or ac voltage is applied to the signal line to cause the MEMS beam to collapse towards the signal line 25a. This ac or dc voltage can be isolated from the rf signal on the signal line by including an inductor in the circuit with the inductance value chosen to be nearly an open circuit at rf frequencies but a short circuit at ac or dc frequencies.

Figure 15A:
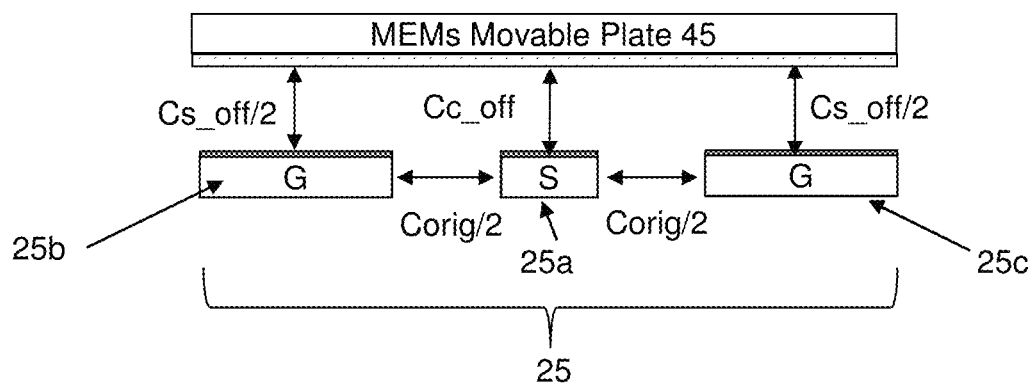
FIGS. 15a and 15b show the structure of FIG. 13 in different states in accordance with aspects of the present invention.
Figure 15B:
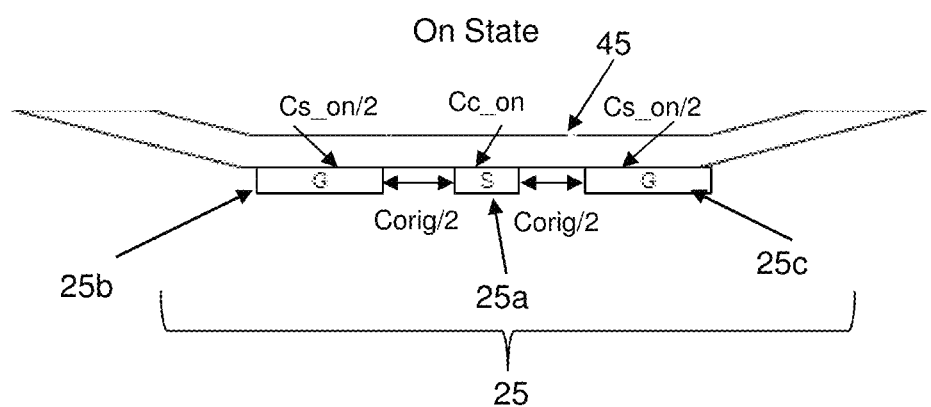

FIGS. 15a and 15b show the MEMS switch illustrated in FIG. 13 in the "on" and "off" state by the moveable plate electrode 45 moving up and down. For example, the MEMS switch moves towards and away from the fixed plate electrode 25 and places the device in the "on" and "off" states. In embodiments, the moveable plate electrode 45 has small capacitance values when "off" and large capacitance values when "on" due to the relationship of the moveable plate electrode 45 to the electrode 25. That is, the close proximity of the moveable plate electrode 45 to the fixed plate electrode 25 will increase capacitance in the "on" state; whereas, in the "off" state, the fixed plate electrode is farther away from the electrode 25 and hence a lower capacitance is achieved.

In embodiments, when the MEMS switch is in its original position of an "off" state, the small value capacitors are built into the CPW design such that a CPW line characteristic impendence of Z0=sqrt(L/(Corig+Cc_off//Cs_off)) is achieved. Otherwise, in the "off" state, the MEMS switch still generates low capacitance (e.g., "off" capacitance), which is a parasitic and can increase in the MEMS insertion loss and also the reflection. The moveable plate electrode 45 can also be structured to contact the fixed plate electrode 25 in the on state, i.e., with insulator materials on the moveable plate electrode 45 contacting the fixed plate electrode 25 (with or without insulator material, or vice versa). When the moveable plate 45 contacts the fixed plate 25, either one of or both plates are coated in a thin capacitor dielectric to form high capacitance capacitors.

In embodiments, when the MEMS switch is in an "on" state the "on" large value capacitors work as a short circuit for rf signals, since the impedance is inversely proportional to the frequency and capacitance, which connects the signal line to the ground lines with a CPW line total capacitance of Ctotal=Corig+Cc_on//Cs_on=>rf frequency short. A portion of the electrode (e.g., electrode portion 45a) is not biased with the electrode portion 25a, whereas the electrode portions 45b and 45c (as shown in FIG. 14) are biased with the electrode portions 25b and 25c. This eliminates the DC path to the signal line.

Figure 16A:
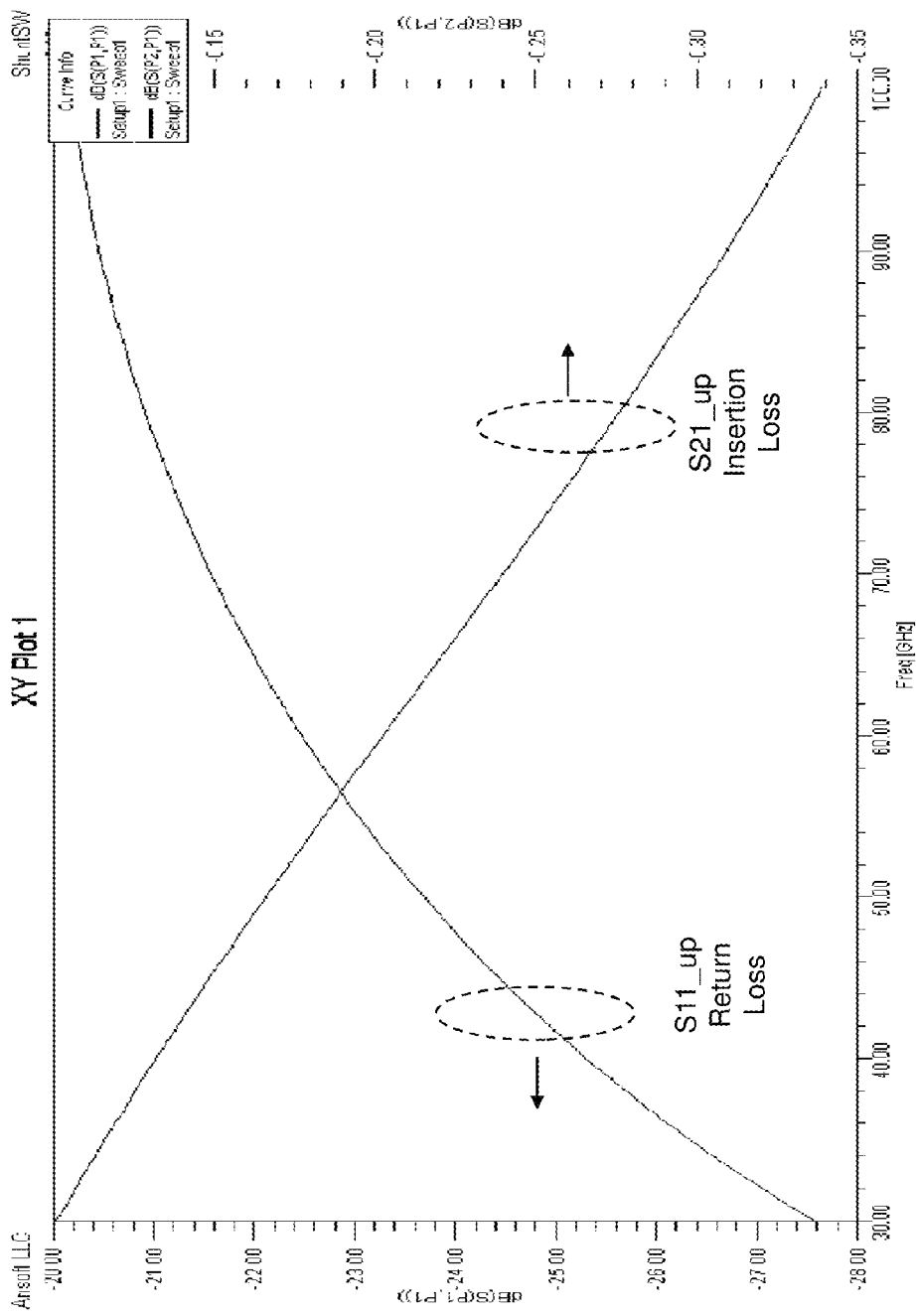
FIGS. 16a and 16b show exemplary graphs that illustrate the "on" and "off" states of a MEMS switch in accordance with aspects of the present invention.
Figure 16B:
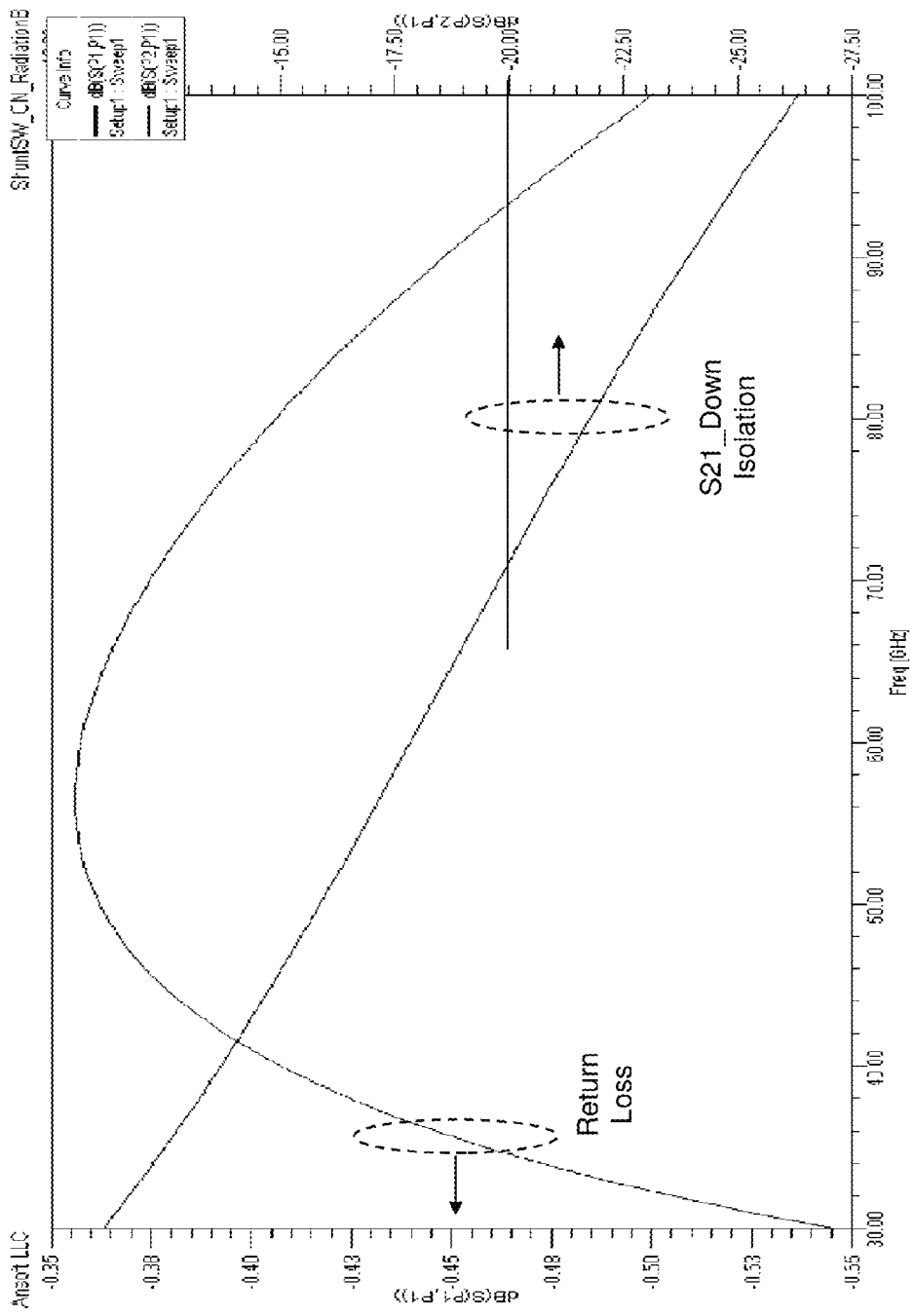

FIGS. 16a and 16b show an electromagnetic simulation of the MEMS switch of the present invention. FIG. 16a shows the "off" state, which shows (S11_up return loss) very little to zero signal disruption occurring in the MEMS device, and less insertion loss (S21_up insertion loss) from the signal propagating through the MEMS device compared to traditional MEMS devices. FIG. 16b shows the "on" state with the signals shunted to ground such that no signal goes through the device.

In accordance with aspects of the invention, the switching capacitors are provided at both the signal and ground lines such that the bias for the MEMS switch can be applied between the moveable plate and the ground lines. Advantageously, this configuration eliminates the need to provide a DC path to the signal line and maintains improved signal integrity for the switch. Also, as the "off" capacitors are part of the CPW control impedance line design, the configuration of the present invention, e.g., "off" capacitors in a manner such that the "off" capacitors, are not a poor parasitic on the signal integrity as compared to typical MEMS devices. Moreover, in embodiments, relatively larger "off" capacitors may be provided, which advantageously allows for a smaller gap between the moveable plate (e.g., the moveable electrode 45a) and the fixed plate (e.g., the fixed electrode 25), improved processing, and lower cost of manufacture.

Figure 17A:
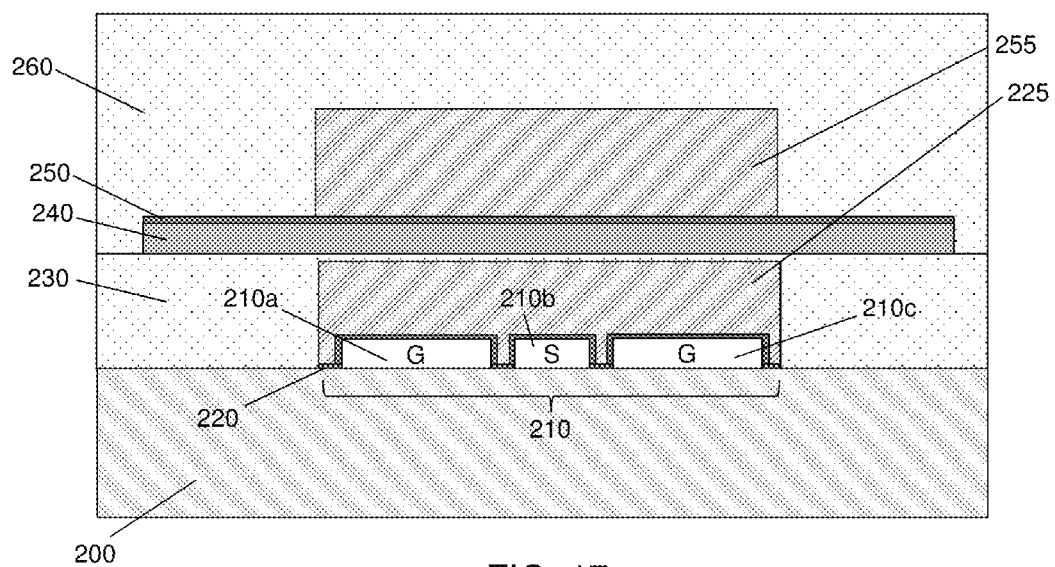
FIGS. 17a and 17b show various alternative structures and related processing steps in accordance with aspects of the present invention.

FIG. 17a shows an alternative embodiment including a structure and related processing steps in accordance with aspects of the invention. The structure includes, for example, a substrate 200. The substrate 200, in embodiments, can be any layer of a device. In embodiments, the substrate 200 is a silicon wafer coated with an insulator layer, e.g., silicon dioxide or other insulator material known to those of skill in the art.

In FIG. 17a, a fixed wiring layer 210 (e.g., an electrode) is deposited on the substrate 200. In embodiments, the fixed wiring 210 can be any material already discussed herein with regard to the fixed wiring layer, e.g., Ti/AlCu/Ti/TiN, etc. The thicknesses of this and other electrodes and/or wires can vary depending on the specific design parameters as also noted herein. An insulator layer 220 is formed on the wiring 210. The wiring 210 can be patterned to form the ground electrodes 210a and 210c and signal electrode 210b, using any conventional patterning and etching processes known to those of skill in the art. In embodiments, these electrodes will be formed in a co-planar arrangement. The wiring 210 may be coated with an insulator layer 220 of a nitride or oxide, which provides a certain capacitance. In embodiments, the insulator layer 220 may be formed using any conventional deposition process known to those of skill in the art, as discussed herein. For example, the insulator layer 220 can be deposited on the wiring 210 to a thickness of about 0.1 μm; although other dimensions are also contemplated by the present invention.

A sacrificial material 225 is conformally deposited over the electrodes 210a, 210b, and 210c. In embodiments, the sacrificial material 225 may be formed using any conventional deposition process known to those of skill in the art, as discussed herein as discussed above. The sacrificial material 225 may be patterned using conventional photolithographic and etching processes. In the exemplary illustration of FIG. 17a, the sacrificial material 225 is formed over the electrodes 210a, 210b, and 210c.

Also shown in FIG. 17a, an insulator material 230 may be deposited over the sacrificial material 225. In embodiments, the insulator material 230 is a deposited oxide using any of the methods discussed above. After an optional CMP process, an electrode 240 is formed over the insulator material 230 (above the sacrificial material 225). In embodiments, the electrode 240 can be formed from any of the materials already discussed herein with regard to the moveable plate such that further discussion is not required herein to understand the invention. In preferred embodiments, the electrode 240 is a metal oxide metal beam formed using conventional deposition and patterning processes known to those of skill in the art. In accordance with aspects of the invention, the electrode 240 is formed and structured as a moveable plate (i.e., a beam) of the MEMS switch that can move towards the wiring 210, e.g., a fixed electrode.

FIG. 17a also shows an optional insulator layer 250 formed on the electrode 240. For example, the electrode 240 may be coated with an insulator layer 250 of a silicon dioxide, which provides a certain capacitance. In embodiments, the insulator layer 250 may be formed using any conventional deposition process known to those of skill in the art, as discussed herein. The insulator layer 250 can be deposited on the electrode 240 to a thickness of about 0.1 μm; although other dimensions are also contemplated by the present invention. The electrode 240 and insulator layer 250 can be patterned to form the upper electrode.

A sacrificial material 255 is deposited over the electrode 240. In embodiments, the sacrificial material 255 may be formed using any conventional deposition and patterning processes known to those of skill in the art, as discussed herein. Prior to the deposition of the sacrificial material 255, the lower sacrificial material 225 can be cleaned to remove any residual oxide. As should be understood by those of skill in the art, the sacrificial material 225 and sacrificial material 255 will form a lower cavity and an upper cavity, respectively, for a MEMS beam. An insulator material 260 is conformally deposited over the electrode 240, and the sacrificial material 255. In embodiments, the insulator material 260 is a deposited oxide using any of the deposition methods discussed above.

Figure 17B:
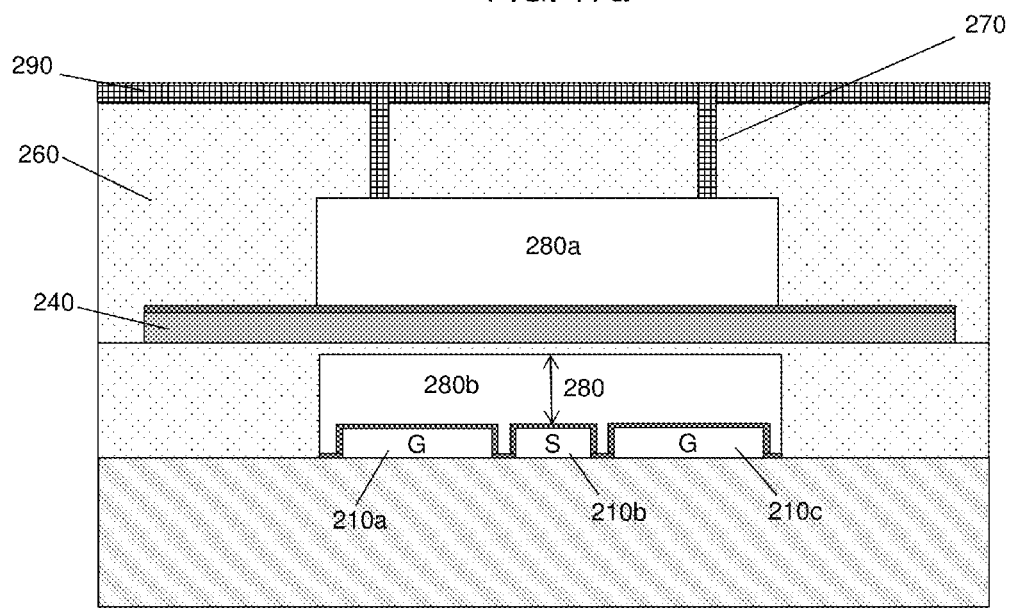

In FIG. 17b, vent holes 270 may be formed in the insulating material 260 in order to remove the sacrificial materials 255 and 225. For example, in embodiments, the vent holes 270 are formed in the insulator material 260 to expose the sacrificial material 255. The vent holes 270 can be formed using conventional photolithographic and etching processes. In embodiments, the vent holes 270 can be different shapes such as circular or octagonal, and can be located at many different positions on the structure. For example, the vent holes 270 can be located over the sacrificial material 255, over the sacrificial material 225 (not shown), or both.

In FIG. 17b, the sacrificial layers 225 and 255 may be removed through the vent holes 270 using conventional techniques. For example, the sacrificial layers 225 and 255 may be removed using plasma ashing, e.g., fluorine plasma, or $XeF_2$ as discussed above. In accordance with aspects of the invention, the removal of the sacrificial materials 225 and 255 will form an upper cavity 280a and lower cavity 280b. In embodiments, the lower cavity 280b is positioned between the lower fixed electrodes 210a, 210b, and 210c and the upper electrode 240. The lower cavity 280a can be about 2 μm with a Coff of approximately 10-100 fF and a Con of approximately 1000-10,000 fF between the electrodes 240 and 210b, as well as between 240 and 210a/210c.

Still referring to FIG. 17b, sealing layer 290 may be deposited in the vent holes 270 (and on insulator layer 260), and planarized such that the upper cavity 280a and lower cavity 280b become vacuum-sealed or air tight. In embodiments, the sealing layer 290 may comprise any suitable non-conformal plugging material, for example PECVD silicon dioxide, as discussed above. FIGS. 15a and 15b are representative of the MEMS switch structure illustrated in FIG. 17b in the "on" and "off" state.

Figure 18:
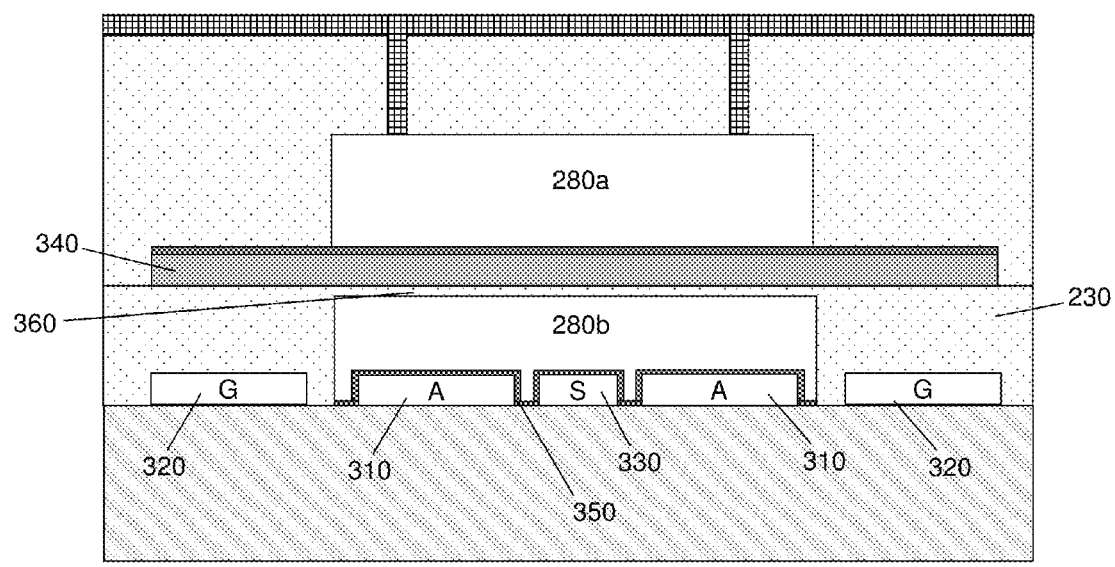
FIG. 18 shows an alternative structure related processing steps in accordance with aspects of the present invention.

FIG. 18 shows an alternative embodiment including a structure and related processing steps in accordance with aspects of the invention. For example, FIG. 18 shows a four terminal MEMS device that can be fabricated with separate actuators 310, ground electrodes 320, and a signal electrode 330. One of ordinary skill in the art would understand that the processing steps for the structure shown in FIG. 18 are similar to the processing steps used for the structures shown in FIGS. 17a and 17b. Specifically, formation of the wiring layer (wiring layer 210 in FIG. 13a) would include deposition of metal material and patterning to form the actuators 310, ground electrodes 320, and the signal electrode 330. In this embodiment, the signal electrode 330 and the actuators 310 are exposed in the lower cavity 280b; whereas, the ground electrodes 320 are embedded in the insulator material 230. In embodiments, the actuators 310, ground electrodes 320, and the signal electrode 330 are coplanar. In embodiments, a lower surface of the MEMS beam 340 and/or an upper surface of the fixed signal electrode 330 and actuators 310 can be coated with a dielectric material, e.g. oxide layers 350 and 360, to prevent electrical arcing between the grounded MEMS beam 340 and the separate actuators 310. Alternatively, the actuators 310 could be recessed below the surface of the signal line 330. Moreover, in preferred embodiments, the MEMS beam 340 is a metal oxide metal beam, fabricated using conventional deposition and patterning processes as known to those of skill in the art such that no further discussion is required to understand the invention.

Figure 19A:
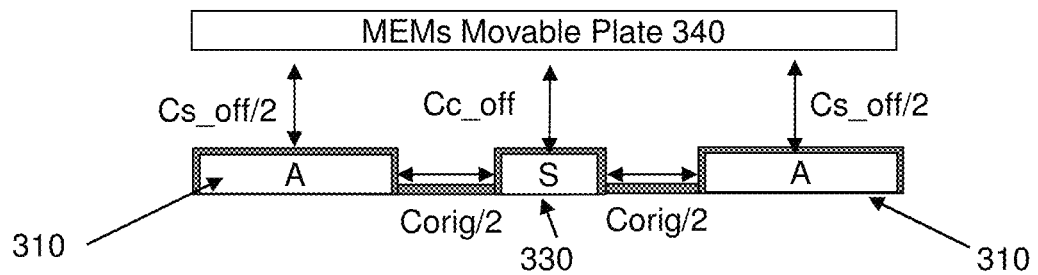
FIGS. 19a and 19b show the structures of FIG. 18 in different states in accordance with aspects of the present invention.
Figure 19B:
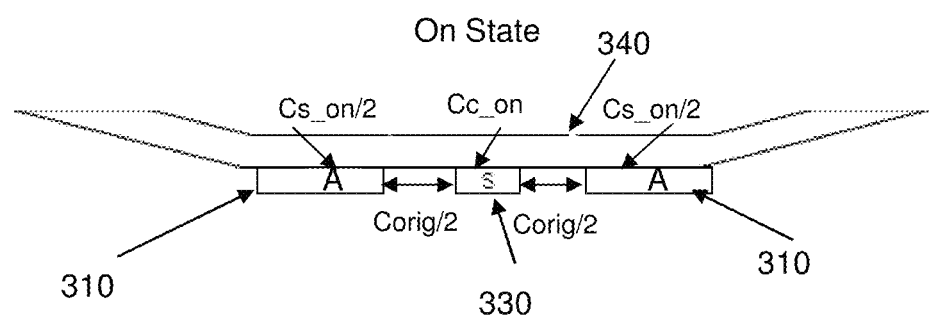

FIGS. 19a and 19b show the MEMS switch structure illustrated in FIG. 18 in the "on" and "off" state. For example, in the "on" state the MEMS moveable plate 340 moves into contact with the actuators 310 and signal electrode 330 (e.g., the fixed plate electrode). In the "off" state the MEMS moveable plate 340 moves away from the fixed plate electrode. In embodiments, the moveable plate electrode 340 has small capacitance values when "off" and large capacitance values when "on" due to the relationship to the fixed plate electrode. That is, the contact of the moveable plate electrode 340 to the fixed plate electrode will increase capacitance in the "on" state; whereas, in the "off" state, the fixed plate electrode is farther away from the moveable plate electrode 340 and hence a lower capacitance is achieved. In embodiments, when the MEMS switch is in its original position of an "off" state, the "off" small value capacitors are built into the CPW design such that a CPW line characteristic impendence of Z0=sqrt (L/(Cc_off+Corig//Cs_off)) is achieved. Otherwise, in the "off" state, the MEMS switch still generates low capacitance (e.g., "off" capacitance), which is a parasitic and can increase in the MEMS insertion loss and the reflection.

In embodiments, when the MEMS switch is in an "on" state, the "on" large value capacitors work as a short circuit to connect the signal line to the ground lines with a CPW line total capacitance of Ctotal=Cc_on+Corig//Cs_on=>AC short. A middle portion of the moveable plate electrode 340 is not biased with the signal line 330, whereas the side portions of the moveable plate electrode 340 are biased with the actuators 310. This eliminates the AC or DC actuation path to the signal line.

In embodiments, the "on" capacitance can be added by increasing the size of the dimensions of the moveable plate along the CPW line. This can be done without affecting the "off" state integrity.

Figure 20:
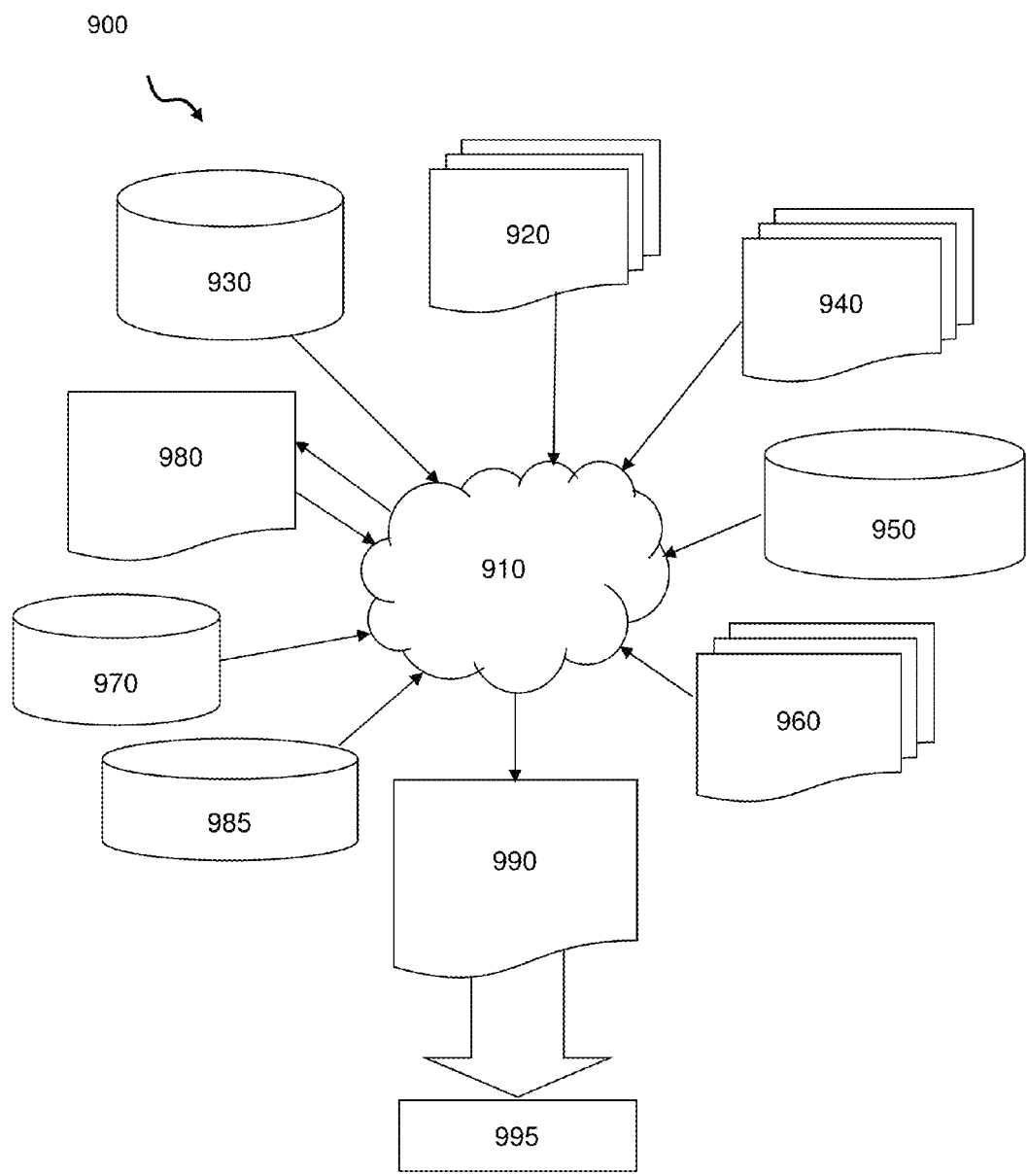
FIG. 20 is a flow diagram of a design process used in semiconductor design, manufacture, and/or test.

FIG. 20 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1-14, 15a, 15b, 17a, 17b, 18, 19a, and 19b. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1-14, 15a, 15b, 17a, 17b, 18, 19a, and 19b to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-14, 15a, 15b, 17a, 17b, 18, 19a, and 19b. In one embodiment, design structure 990 may comprise a compiled, executable HDL simulation model that functionally simulates the devices shown in FIGS. 1-14, 15a, 15b, 17a, 17b, 18, 19a, and 19b.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-14, 15a, 15b, 17a, 17b, 18, 19a, and 19b. Design structure 990 may then proceed to a stage 995 where, for example, design structure 990: proceeds to tape-out, is released to manufacturing, is released to a mask house, is sent to another design house, is sent back to the customer, etc.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure comprising:
    a coplanar waveguide (CPW) comprising a signal line and ground lines formed on a substrate;
    a moveable plate provided over the CPW and facing the CPW; and
    a fixed plate provided between the CPW and the moveable plate,
    wherein the moveable plate is structured to move towards the fixed plate in an "on" state and remain in an original position in an "off" state, and
        in the "on" state an input signal on the signal line shorts to the ground lines; and
        in the "off" state the input signal on the signal line passes though the moveable plate as an output signal.

2. The structure of claim 1, wherein the moveable plate forms three capacitors with the fixed plate.

3. The structure of claim 1, wherein the fixed plate is an intermediate structure formed between the CPW and the moveable plate.

4. The structure of claim 1, wherein the CPW comprises the fixed plate for attracting the moveable plate.

5. The structure of claim 1, wherein:
    the signal line and ground lines are within a cavity;
    the moveable plate is in the cavity facing the signal line and the ground lines; and
    in the "on" state, the moveable plate is structured to bend toward and contact the signal line and the ground lines within the cavity.

6. The structure of claim 1, wherein the CPW further comprises actuators between the signal line and the ground lines, the actuators and the signal line are provided in a cavity shared with the moveable plate.

7. The structure of claim 6, wherein, in the "on" state, the moveable plate is structured to bend towards and contact the signal line and the actuators within the cavity.

8. The structure of claim 1, wherein:
    the moveable plate is configured to bend towards the fixed plate in an "on" state;
    the moveable plate forms three capacitors with the fixed plate; and
    the three capacitors have small capacitance values when in an "off" state and large capacitance values when in the "on" state.

9. The structure of claim 1, wherein the moveable plate is a MEMS beam comprising oxide-metal-oxide.

10. The structure of claim 1, wherein at least one of the signal line and the ground lines are coated with an insulator and the moveable plate is lined with an insulator on a surface facing the signal line and the ground lines.

11. The structure of claim 1, further comprising:
    a first cavity formed over the CPW, wherein the fixed plate is provided over the first cavity; and
    a second cavity formed over the fixed plate which is exposed to the CPW via the first cavity below the fixed plate.

12. A structure comprising:

a coplanar waveguide (CPW) comprising a signal line and ground lines formed on a substrate; and a moveable plate provided over the CPW and facing the CPW, wherein the moveable plate is structured to move towards a fixed plate in an "on" state and remain in an original position in an "off" state, and in the "on" state an input signal on the signal line shorts to the ground lines; and in the "off" state the input signal on the signal line passes though the moveable plate as an output signal, wherein:

the signal line and ground lines are within a cavity;

the moveable plate is in the cavity facing the signal line and the ground lines;

in the "on" state, the moveable plate is structured to bend toward and contact the signal line and the ground lines within the cavity; and at least one of the signal line and the ground lines are coated with an insulator and the moveable plate is lined with an insulator on a surface facing the signal line and the ground lines.

* * * * *